March 2, 1971  RYO ANDO ET AL  3,567,204
APPARATUS FOR REFINING MOLTEN METAL
Original Filed July 25, 1967  3 Sheets-Sheet 1

INVENTOR.
RYO ANDO, TATOMU FUKUSHIMA,
KOKICHI HAGIWARA,
EIICHI HIRAGUCHI

March 2, 1971  RYO ANDO ET AL  3,567,204
APPARATUS FOR REFINING MOLTEN METAL
Original Filed July 25, 1967  3 Sheets-Sheet 2

INVENTOR.
RYO ANDO, TOTOMU FUKUSHIMA,
KOKICHI HAGIWARA,
EIICHI HIRAGUCHI

United States Patent Office

3,567,204
Patented Mar. 2, 1971

3,567,204
APPARATUS FOR REFINING MOLTEN METAL
Ryo Ando and Tsutomu Fukushima, Yokohama-shi, Eiichi Hiraguchi, Toyoda-gun, and Kokichi Hagiwara, Yokohama-shi, Japan, assignors to Nippon Kokan Kabushiki Kaisha, Tokyo, Japan
Original application July 25, 1967, Ser. No. 655,921. Divided and this application May 5, 1969, Ser. No. 821,877
Int. Cl. C21c 7/00
U.S. Cl. 266—34
3 Claims

ABSTRACT OF THE DISCLOSURE

An apparatus for refining a molten metal such as molten pig iron. The molten metal which contains impurities is poured into a vessel such as a suitable ladle. A purifying agent which reacts with the molten metal to eliminate at least part of the impurities thereof is added to the molten metal. Then the molten metal to which the purifying agent has been added is stirred only in the region of the surface of the molten metal. The adding of the purifying agent to the molten metal and the stirring thereof takes place after the molten metal has been poured into the vessel during a period of time when parts of the body of molten metal within the vessel are still in motion. In the case of pig iron this period of time has a duration of at least one hour.

The apparatus includes the vessel into which the molten metal is poured up to a given elevation in the vessel, and a stirring means which is situated over the vessel and extends into the molten metal therein, this stirring means including at least one stirrer which extends downwardly into the vessel through the surface of the molten metal to an elevation which is only slightly less than the above given elevation where the surface of the metal is located. The extent to which the stirrer extends to an elevation lower than this latter given elevation is less than one third of the latter given elevation.

CROSS REFERENCE TO THE RELATED APPLICATION

This application is a division of our co-pending application Ser. No. 655,921, filed July 25, 1967, and entitled Method for Refining Molten Metal.

BACKGROUND OF THE INVENTION

The present invention relates to the refining of molten metals.

In particular, the present invention is applicable to the refining of molten pig iron and is especially useful in desulfurizing and in dephosphorizing the molten pig iron.

At the present time impurities are removed from molten pig iron or the composition of alloys, when manufacturing pig iron, steel, and the like, are adjusted in blast furnaces, cupolas, converters, open-hearth furnaces, electric furnaces, etc. However, only a limited extent of refinement can be carried out with such conventional structures.

There has thus been a long-felt want in the art for an inexpensive pre-treatment or post treatment of the molten metal to refine the latter in a manner which can be easily practiced and which can achieve constant, predictable results.

Among the presently known methods for carrying out pretreatments, such as desulfurization, are a ladle-transfer pouring method, the Pellan process, a method wherein a powdered desulfurizing agent such as carbide and the like is blown in with a gas in which the powder is suspended, an agitation method utilizing an impeller, and similar methods. All of these known methods have the serious disadvantage of being incapable of achieving a constant rate of desulfurization, and in addition they suffer from the disadvantage of an unavoidable loss of desulfurizing agent which does not react with the molten pig iron. This latter loss is excessive due to spattering of the molten metal or insufficient agitation thereof, thus undesirably increasing the cost of the treatment. Similar difficulties and disadvantages are encountered in an unavoidable manner with known dephosphorization treatments as well as in known treatments for adjusting the composition of alloys.

A more effective desulfurization method, according to which the ladle is vibrated, has been recently developed. With this latter method the ladle is vibrated so as to promote a more intimate contact between the molten pig iron and the purifying agent, thus increasing the refining efficiency. However, the cost of the vibrating installation and the power required to vibrate a huge ladle and its contents is prohibitive, and in addition the ratio of the volume of the molten pig iron to the volume of the ladle is small. Furthermore, this latter method is accompanied by the serious disadvantage of an unavoidable, excessive drop in the temperature of the molten pig iron.

Inasmuch as the refinement of molten metals such as molten irons or iron alloys is brought about by reactions between the slag and molten pig iron and reacting agents which are in a gaseous state, in order to accelerate the reactions it is essential to increase the contact area between the treated metal which is in a liquid state and the reacting agent which is in a gaseous state, and the attempt is always to bring the reaction agent which is in the gaseous state into contact with constantly changing liquid surfaces of the molten metal which is treated. These factors are well recognized by those skilled in the art. Thus, in order to effectively utilize the reaction agents it is essential to provide a constant agitation of the reaction agents so as to cause them to come into intimate contact with the molten metal such as molten pig iron. While a method such as the above ladle vibrating method achieves a certain degree of refinement, in a manner similar to other known methods, since the reaction agents are distributed over the entire surface of the molten pig iron the entire contents of the latter are stirred and it is necessary to vibrate or oscillate the huge ladle in its entirety in order to bring about the desired extent of contact between the treated metal and the purifying agent.

Thus, with the prior art techniques it has always been considered essential to provide the largest possible area of contact between the purifying agent and thus the entire mass of molten iron is stirred or otherwise agitated in order to attempt to achieve the intimate contact with the purifying agent which will give the most satisfactory results.

SUMMARY OF THE INVENTION

It is a primary object of the present invention to provide an apparatus for effectively refining molten metals while avoiding the drawbacks of the prior art as referred to above.

Thus, it is an object of the invention to provide an apparatus capable of effectively refining a molten metal in a simple, economical manner, utilizing a relatively small degree of agitation of the body of molten metal.

In accordance with the invention the molten metal which contains the impurities and which is to be refined is poured into a vessel such as a suitable ladle, and a suitable purifying agent is added to react with the molten metal so as to eliminate at least part of the impurities thereof. Then this molten metal to which the purifying agent has been added is stirred only in the region of the surface of the molten metal. The adding of the purifying agent to the molten metal and the stirring thereof is carried out during a period of time when parts of the body of molten metal within the vessel are still in motion.

With the apparatus of the invention, the vessel has the molten metal situated therein with the surface of the molten metal located at a given elevation in the vessel, and a stirring means is situated over and extends into the vessel and includes a stirrer which extends downwardly into the vessel to a relatively small extent below the given elevation at which the surface of the molten metal is located.

BRIEF DESCRIPTION OF DRAWINGS

The invention is illustrated by way of example in the accompanying drawings which form part of this application and in which.

DESCRIPTION OF PREFERRED EMBODIMENTS

The invention is based upon the concept or discovery that after a molten metal is poured into a vessel parts of the body of molten metal remain in motion over a substantial period of time. Thus, it has been found that due to natural convection, diffusion, and/or inertia of various parts of the molten metal, there are within the body of molten metal currents which persist over a substantial period of time after the metal is poured into a vessel. Thus, when a molten metal such as molten pig iron is poured into a ladle from a blast furnace, or is transferred to a vessel such as a torpedo car to be used in connection with charging an open-hearth furnace or converter, or where the molten pig iron is situated within the front part of a cupola or in a trough which forms a runner from a blast furnace, flowing movements of parts of the body of molten metal within the vessel, in the form of currents of the molten metal, persist for a considerable period of time after the metal has been poured.

Figure 9:
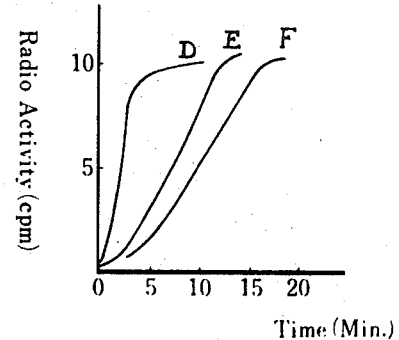
FIG. 9 is a graphic illustration of the time during which parts of a body of molten metal remain in motion after the molten metal is poured into a vessel.

In order to establish these facts, experiments were carried out. In these experiments molten pig iron was poured into a 30 ton ladle from a blast furnace, and an isotope of gold Au 128 was placed in the bottom of the ladle. The relationship between the elapsed time and the intensity of radiation emanating from the surface of the molten pig iron was measured to obtain the results which are illustrated in FIG. 9. The curve D of FIG. 9 shows the results of measurements obtained when Au 128 was incorporated into the molten metal 16 minutes after the pouring thereof into the ladle. The curve E of FIG. 9 shows the results obtained with measurements taken in a test where Au 128 was incorporated into the ladle 39 minutes after the molten pig iron was poured. The curve F shows measurements taken when Au 128 was incorporated into the body of molten metal 60 minutes after the pouring thereof into the ladle. From these curves it has been discovered that indeed a molten metal such as molten pig iron, after it is poured into a vessel such as a suitable ladle, continues to have parts of the body of molten metal which persist in motion over a very long period of time which in the case of pig iron has a duration of at least one hour. Furthermore, the curves demonstrate that the molten metal such as molten pig iron mixed with the additive at an extremely high speed.

Based upon the results of these tests, it has been concluded that sufficient refining, such as desulfurization, can be carried out by taking advantage of the fact that parts of the body of molten metal, after it is poured into a vessel, persist in motion over a long period of time so that it is in fact unnecessary to stir the molten metal throughout the body thereof and instead the stirring can be limited only to a relatively shallow portion of the molten metal in the region of its surface where the molten metal is in contact with the purifying agent. It thus becomes unnecessary to carry out the stirring all the way down to the bottom of the vessel, as long as the refining operations are carried out after the pouring during the period of time when parts of the body of molten metal persist in their flowing movements.

In the case of the desulfurization of pig iron extensive experiments have demonstrated that 85–90% desulfurization can be achieved when molten pig iron which has been poured into the ladle is stirred with a stirring means which has stirrer rods which extend into the body of molten metal downwardly from the surface thereof to a depth which is less than $\frac{1}{3}$ of the total depth of the molten metal. In this case desulfurization of 85–90% was achieved with the stirrer rods extending into the body of molten metal downwardly below the surface thereof to a depth of about $\frac{1}{10}$ to $\frac{3}{10}$ of the total depth of the molten pig iron in the ladle.

Figure 10:
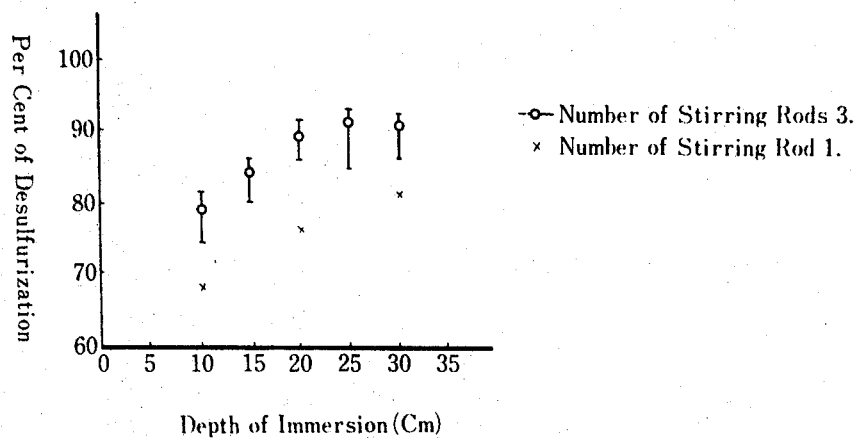
FIG. 10 is a graph illustrating the results achieved in tests to determine the relation between the depth of immersion of stirrers and the number thereof.

FIG. 10 is a graph illustrating the results achieved during desulfurization on the one hand with a single stirrer rod inserted to a depth of 10–30% of the total depth of the molten metal and on the other hand with three stirrer rods also inserted to a depth of 10–30% of the total depth of the molten metal. Thus, the lower curve of FIG. 10 illustrates stirring with a single stirrer, while the upper curve illustrates stirring with three stirrers, and it is apparent from FIG. 10 in both cases a relatively high degree of desulfurization was achieved even though the stirring operations were limited to the region of the surface of the molten metal.

In carrying out the tests used to provide the graph shown in FIG. 10, the molten pig iron was poured into a ladle having a capacity of 30 tons up to a depth of 2000 mm. within the vessel, and CaCo was added at a rate of 4 kg./TMM. The stirring rods were rotated at 90 r.p.m. It was found that where the stirrer rods have an irregular cross section, such as a cross section of X-shaped or Y-shaped configuration, a somewhat better desulfurization was achieved than in the case where stirrer rods of circular cross section were used, and in addition it was found that a depth of immersion of the stirrer rods less than $\frac{1}{3}$ of the total depth of the molten pig iron was sufficient to achieve the desired results.

Thus, with the invention it is possible, by incorporating a purifying agent such as a desulfurizing agent or a dephosphorizing agent into the molten pig iron after it is poured into a ladle or similar vessel and while currents persist in the body of molten metal to bring about the desired degree of refining while stirring only a relatively shallow portion of the molten pig iron in the region of the surface thereof by way of a suitable stirring means. Thus, the desired degree of desulfurization or dephosphorization, in the case of molten pig iron, can be achieved without stirring the body of molten metal all the way down to the lowermost part thereof in the vessel.

It is only necessary to stir the molten pig iron in the region of its surface, so that it becomes possible to use a stirring means of simple construction, thus reducing the cost of the installation as well as the cost of the power required to operate the stirring installation.

Figure 1:
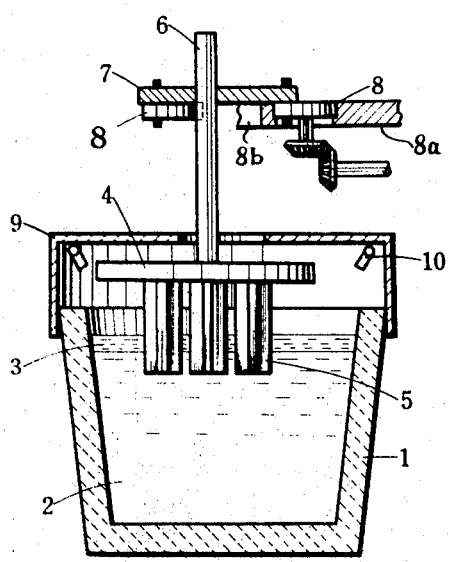
FIG. 1 is a sectional elevation of one possible embodiment of an apparatus of the present invention.
Figure 2:
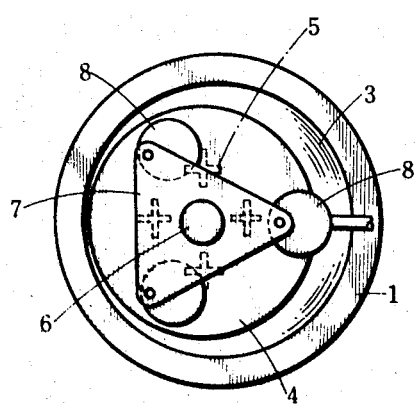
FIG. 2 is a top plan view of the structure of FIG. 1 with the ladle cover removed.

FIGS. 1 and 2 illustrate one possible embodiment of an apparatus of the invention. With this embodiment there are four stirrers in the form of elongated vertically extending rods 5 of X-shaped cross section. These rods are fixed at their top ends to the lower surface of a horizontal disc 4 which thus fixedly carries the stirrers 5. These stirrers extend perpendicularly to the surface of the body of molten metal in the vessel 1 downwardly into the molten metal only to a depth which is in the region of the surface thereof, this depth being less than one third of the total depth of the body of molten metal. Thus, there is shown in FIG. 1 a body of molten pig iron 2 which is to be refined by way of a purifying agent 3 which floats on the surface of the molten pig iron and which is added after the molten pig iron is introduced into the vessel 1, which may take the form of a ladle, although it may also be in the form of the runner of a blast furnace or the front lower part of a cupola where the molten metal is accessible, as is well known. The stirrer-carrying disc 4 is driven by an eccentric drive which forms part of the stirring means of this embodiment and which includes the bevel gear train shown in FIG. 1. This gear train drives a disc 8 which is eccentrically and pivotally connected to a corner portion of an eccentric driving disc which is of substantially triangular configuration, as is apparent from FIG. 2. The discs 8 which are respectively pivotally and eccentrically connected to the corners of the plate 7 are supported for rotary motion about their axes, respectively, which extend vertically, in any suitable bearings, so that these relatively small circular discs support the eccentric plate 7 for eccentric rotary motion. For example, the discs 8 may be supported for rotary movement about their central axes, respectively, on bearing surfaces of a support plate 8a, as schematically represented in section for the right disc 8 of FIG. 1. The other discs 8 are supported for rotary movement in exactly the same way. Only one of these circular discs need be driven by way of the bevel gear drive 8, as illustrated. A central portion of the triangular eccentric plate 7 fixedly carries a shaft 6 which extends vertically down to the top of the stirrer-carrying disc 4, this shaft 6 being fixed to a central part of the disc 4 as well as to a central part of the plate 7. The support plate 8a is formed with an opening 8b through which the shaft 6 extends. Thus, with this construction the stirrers 5 will be driven eccentrically along closed paths, bringing about stirring of the molten metal in the region of the surface thereof. Of course, these operations, as well as the addition of the purifying agent 3, are carried out after the pouring of the molten pig iron 2 into the vessel 1 while parts of the body of molten metal in the vessel 1 continue in motion.

While the stirrers 5 of FIGS. 1 and 2 are shown as having an X-shaped cross section, other cross-sectional configurations can be used such as Y-shaped, square, triangular, or even circular cross-sectional configurations, although the irregular configurations provide superior results, as pointed out above.

The vessel 1 is covered by a lid which is indicated schematically in FIG. 1 and which is omitted from FIG. 2 so as to illustrate more clearly the stirring means. This lid has a downwardly extending side wall engaging the exterior upper portion of the vessel and a top wall formed with an opening large enough to accommodate the eccentric movement of the shaft 6. In addition, suitable tubes 10 extend through the side walls of the lid to the space beneath the latter to introduce a suitable protective or atmospheric gas into the vessel over the contents thereof. In the case of desulfurizing molten pig iron, the purifying agent is carbide, calcium nitride, soda ash, and the like, while reducing gas such as coke furnace gas, blast furnace gas, etc. are used as the atmospheric, protective gas forming the atmosphere above the contents of the vessel during the purifying reactions. In order to bring about dephosphorization of the molten pig iron, the purifying agents are a highly basic sintered ore, limestone, and the like, while the protective atmosphere introduced through the tubes 10 is oxygen, as is well known.

The apparatus of the invention which thus requires the plurality of elongated stirrers to be moved only in the region of the surface of the molten body of metal is far simpler in construction and requires far less power than conventional structures of this type.

The material which is used for the stirrers 5 is refractory so as to prevent erosion thereof and so as to have no influence on the refining reactions. For example, in the case of desulfurization of molten pig iron, reducing materials such as refractory materials of graphite are advantageously used for the stirrers, particularly since they have a high thermal resistance and will remain uninfluenced by heat shock. In the case of dephosphorization of molten pig iron, since the stirrers are in contact with a highly basic slag, the stirrers are made of a basic refractory material such as magnesia dolomite. However, inasmuch as these latter materials do not have a particularly high thermal resistance and may indeed be influenced by heat shock, it is preferred to reinforce the stirrers by surrounding them with graphite-type materials, such as those materials of the rods which are used in the case of desulfurization of the pig iron. Thus, in this case, namely in the case of dephosphorization, the stirrers which are made of a basically refractory material such as magnesia dolomite are covered with coatings of a graphite-type of material.

Figure 3:
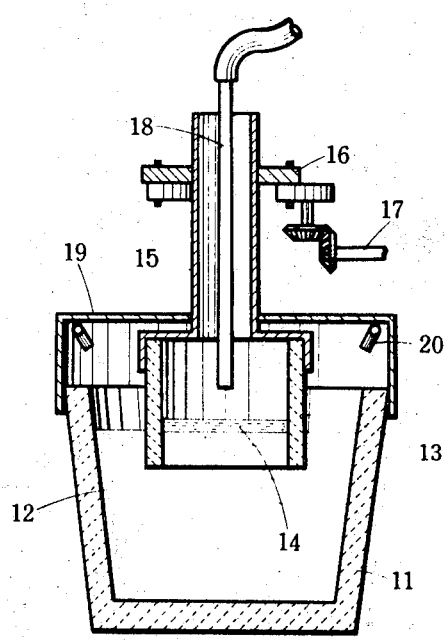
FIG. 3 is a schematic sectional elevation of a further embodiment of an apparatus of the invention.

According to the embodiment of the apparatus of the invention which is illustrated in FIG. 3, the stirrer of the stirring means takes the form of a hollow cylindrical member 13 whose axis extends vertically, and a lower end portion of this cylindrical hollow stirrer is vertically immersed into the body of molten pig iron 12 only to a depth which is situated in the region of the surface thereof, this molten pig iron 12 having been poured into the vessel 11. Within the hollow stirrer 13 is situated at least part of the purifying agent 14 which floats on the upper surface of the molten pig iron 12. The cylindrical stirrer 13 is fixedly connected to a flange which is situated at the bottom end of a hollow shaft 15 which is eccentrically driven as through a drive similar to that of FIGS. 1 and 2. Thus, this drive includes the eccentric camming plate 16 which may be similar to the plate 7 and the bevel gear drive 17 which drives one of the rotary discs which is pivotally connected with a corner portion of the plate 16 at a location spaced from the center of the disc which is driven by the bevel gear drive 17.

A suitable protective gas is supplied to the interior of the cylinder 13 through a pipe 18 so as to control the gaseous phase or protective atmosphere within the cylinder 13. For example, in order to bring about desulfurization, a reducing gas such as coke furnace gas or the like, is admitted through the pipe 18, while in the case of dephosphorization oxygen is supplied at a suitable pressure.

With this embodiment the upper surface of the molten pig iron which is situated outwardly beyond the cylindrical stirrer 13 is heated by combustion of suitable gases introduced into the interior of the lid 19 through the pipes 20. This lid 19 has a construction similar to the lid of FIG. 1 and is also provided in its top wall with an opening large enough to accommodate the required extent of eccentric movement of the hollow shaft 15, and of course the pipe 18 moves with the hollow shaft 15, this pipe 18 having a flexible, hose-type of connection with the source of protective gas.

Figure 4:
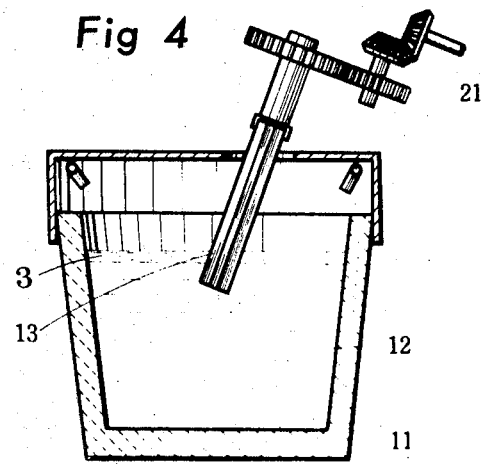
FIG. 4 is a schematic sectional elevation of yet another embodiment of an apparatus of the invention.

In a further embodiment of the invention which is illustrated in FIG. 4 the stirring of the body of molten metal is brought about by way of a single elongated stirrer 13a which may have an X-shaped cross section, or an elliptical cross section, if desired. With this embodiment the single stirrer is introduced through the opening in the lid into the body of molten metal on which the purifying agent floats to a depth which is limited to the region of the surface of the body of molten metal, and through a drive such as the gear transmission 21 illustrated in FIG. 4 the single elongated stirrer 13a is simply rotated about its axis, any suitable bearing structure being provided to support the stirrer for rotary movement about its axis. Thus, in this case the stirrer does not extend perpendicularly to the surface of the molten metal but is rather inclined thereto at an angle other than a right angle.

Figure 5:
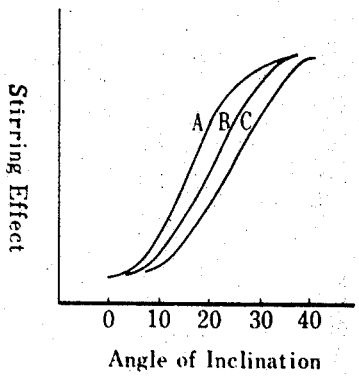
FIG. 5 is a graph illustrating the operation of the embodiment of FIG. 4.
Figure 7:
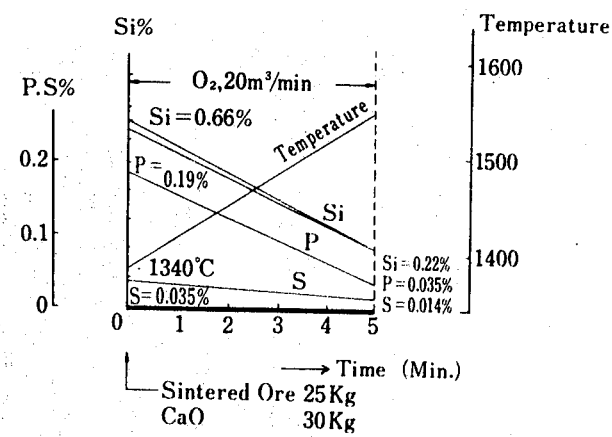
FIG. 7 is a graphic illustration of one example of a method carried out according to the invention.

The stirring effect which is achieved with the embodiment of FIG. 4 is determined by the angle of inclination of the elongated stirrer and the speed at which it is rotated. The curves of FIG. 5 illustrate the relation between the angle of inclination of the stirrer and the number of revolutions thereof. Curve A shows the results achieved at various angles of inclination when the stirrer is rotated at a high speed, while the curve B shows the results achieved at different angles of inclination when the stirrer is rotated at an intermediate speed, and curve C shows the stirring effects achieved at different inclinations of the stirrer when the latter is rotated at a low speed.

In connection with FIG. 5, the high, intermediate and low speeds may respectively be on the order of 130 r.p.m., 110 r.p.m., and 90 r.p.m. In actual practice, the depth of immersion of the stirrers were within the range of about 200 mm. to 50 mm.

Figure 6:
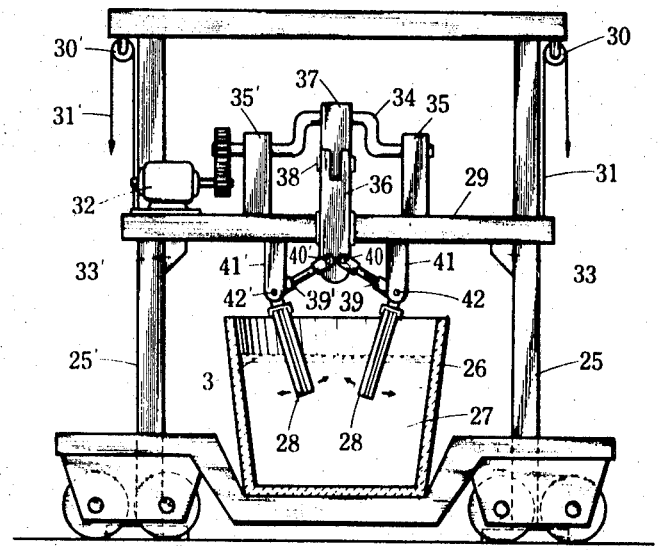
FIG. 6 is a schematic sectional elevation of yet another embodiment of an apparatus of the invention.
Figure 8:
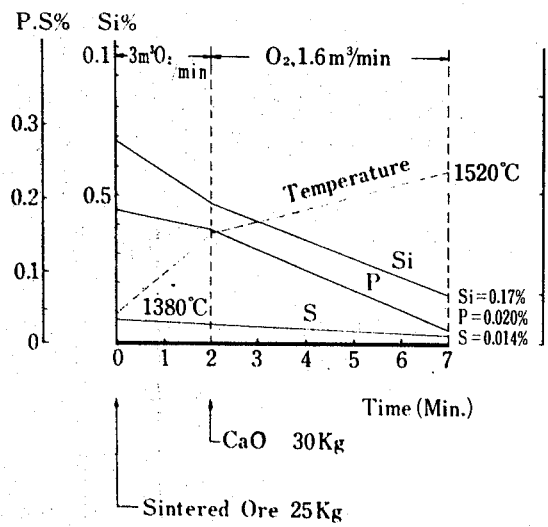
FIG. 8 is a graphic illustration of another specific example of a method according to the invention.

Referring now to FIG. 6, the embodiment of the apparatus of the invention which is illustrated therein includes a vessel such as the ladle 26 in which the body of molten metal 27, such as pig iron, is located. The vessel 26 is carried on a base member which fixedly carries the upwardly directed standards or columns 25 and 25' which are fixed to each other at their top ends by an upper beam which carries at its underside suitable brackets on which pulleys 30 and 30' are supported for rotary movement. A beam 29 extends horizontally between the standards 25 and 25' and is formed with openings or notches through which the standards extend, this beam 29 fixedly carrying at its underside blocks 33 and 33' which slidably engage the columns 25 and 25'. Cables, ropes, or the like 30 and 31 are fixed to the outer ends of the beam 29, beyond the columns 25 and 25' and extend respectively around the pulleys 30 and 30', so that these cables may be actuated to raise and lower the beam 29. Instead of a cable-and-pulley system for raising and lowering the beam 29, structures such as hydraulic jacks may be used.

The beam 29 carries an electric motor 32, connected to any suitable source of current, and this motor through a suitable transmission drives the crank shaft 34 which is supported for rotation in suitable bearing blocks 35 and 35' which are fixed to and extend upwardly from the beam 29. At its intermediate crank portion, the crank shaft 34 is pivotally connected to a connecting rod 37 which is in turn pivotally connected at 38 with the top end of a vertically displaceable plunger 36 whose axis coincides with the central axis of the ladle 26, if desired. The beam 29 is formed with a suitable opening carrying a bushing or the like through which the plunger 36 is guided for vertical reciprocating movement. The lower end of the plunger 36 is pivotally connected at 40 and 40' with a pair of bell cranks 39 and 39', respectively, which are in turn pivotally connected at the intersections of their arms to supporting brackets 41 and 41' fixed to and extending downwardly from the beam 29. Pivotal connections 42 and 42' are provided for the bell cranks 39 and 39' at the brackets 41 and 41', respectively. The lower ends of the bell cranks 39 and 39' are respectively fixed to the top ends of a pair of elongated stirrers 28 and 28' so that these stirrers, which may have an X-shaped cross section, respectively form extensions of the arms of the bell cranks which extend downwardly from the pivots 42 and 42', respectively.

Thus, with this embodiment the stirrer means includes the crank drive which produces oscillatory swinging movement of the stirrers 28 and 28' back and forth about the pivots 42 and 42', and these stirrers 28 and 28' are symmetrically situated with respect to the axis of the vessel 26. It will be noted that in accordance with the invention the stirrers 28 also extend to only a small extent into the body of molten metal beneath the surface thereof so that the stirring is limited to the region of the surface of the body of molten metal.

It is apparent from the above description that with the apparatus of the invention a vessel is provided which is capable of receiving molten metal with the surface of the molten metal situated in an upper region of the vessel. The stirring means which is located over the vessel extends into the latter only at the upper region thereof for stirring the molten metal therein. This stirring means includes at least one stirrer which extends downwardly into the vessel for bodily displacement in its entirety with respect to the vessel to different portions of the upper region thereof.

Thus, with the apparatus of the invention the stirring means acts only at the region of the surface of the molten metal such as molten pig iron, so that the cost of the apparatus and the cost for operating the same is relatively low, while at the same time a highly efficient refining can be achieved even though the stirring is limited to the region of the surface of the body of molten metal. Moreover, the protective atmosphere in which the refining actions take place can be readily controlled because the refining reactions take place only at the region of the surface of the molten metal. In addition, full utilization is made of the purifying agent since there is substantially no loss thereof resulting from spattering or resulting from excessive amounts of purifying agent which do not enter into the reaction.

What is claimed is:

1. In an apparatus for refining molten metal, a vessel capable of receiving the molten metal with the surface thereof situated in an upper region of the vessel, and stirring means located over and extending into the vessel only at the upper region thereof for stirring the molten metal therein, said stirring means including at least one stirrer extending downwardly into the vessel for bodily displacement in its entirety with respect to the vessel to different portions of the upper region thereof, said stirring means including a plurality of rotary discs located in a common plane and respectively supported for rotation about their axes, a drive means operatively connected with one of said discs for rotating the latter, an eccentric plate pivotally connected with said plurality of discs at locations spaced from the central axes thereof for carrying out an eccentric motion in response to driving of said one disc, and said stirrer being fixed to said eccentric plate for moving eccentrically therewith.

2. The combination of claim 1 and wherein said stirring means includes a plurality of elongated stirrers extending into the molten metal perpendicularly through the surface thereof, all of said stirrers being fixed at their top ends to a stirrer-carrying disc, and a shaft fixing the latter disc to said eccentric plate, so that all of said stirrers move eccentrically to carry out a bodily displacement to different portions of the molten metal in said vessel.

3. In an apparatus for refining a molten metal, a vessel for receiving the molten metal with the surface thereof situated at a given elevation in the vessel, and stirring means located over and extending into the vessel for stirring the molten metal therein, said stirring means including at least one elongated stirrer extending downwardly into the vessel to an elevation which is only slightly lower than said given elevation, said stirring means including a crank drive operatively connected with said stirrer for reciprocating the latter back and forth, there being at least a pair of stirrers symmetrically situated with respect to a central axis of said vessel, and said crank drive including a pair of bell cranks operatively connected with said stirrers for swinging them back and forth, a plunger having an axis coinciding with the axis of the vessel and operatively connected with said bell cranks for swinging the latter, a connecting rod connected to said plunger, and a rotary crank shaft connected to said connecting rod.

References Cited

UNITED STATES PATENTS

| | | | |
|---|---|---|---|
| 274,383 | 3/1883 | Rigby | 259—108X |
| 687,182 | 11/1901 | Franklin | 259—107X |
| 964,935 | 7/1910 | Poulin et al | 259—108X |
| 1,942,202 | 1/1934 | Cohn | 266—34X |
| 2,290,961 | 7/1942 | Heuer. | |
| 3,223,389 | 12/1965 | Simmonds | 259—106 |
| 3,278,295 | 10/1966 | Ostberg et al. | 266—34X |
| 3,323,782 | 6/1967 | Clough | 259—108 |
| 3,459,536 | 8/1969 | Touzalin et al. | 266—34X |
| 1,866,227 | 7/1932 | Schaughnessy | 259—102 |
| 2,348,719 | 5/1944 | Blumenthal | 75—93 |
| 2,808,239 | 10/1957 | Reiffen | 259—102 |
| 2,854,222 | 9/1958 | Dening et al. | 259—102 |

FOREIGN PATENTS

| | | | |
|---|---|---|---|
| 242,012 | 12/1962 | Australia | 75—61 |

J. SPENCER OVERHOLSER, Primary Examiner

J. S. BROWN, Assistant Examiner

U.S. Cl. X.R.

75—61; 259—114